US006761522B2

(12) United States Patent
Jäger

(10) Patent No.: US 6,761,522 B2
(45) Date of Patent: Jul. 13, 2004

(54) AUTOMATED CELL FOR HANDLING OF WORKPIECES

(75) Inventor: Helmut F. Jäger, Königsbach-Stein (DE)

(73) Assignee: Felsomat GmbH & Co., Koenigsbach-Stein (DE)

(*) Notice: Subject to any disclaimer, the term of this patent is extended or adjusted under 35 U.S.C. 154(b) by 9 days.

(21) Appl. No.: 10/047,714

(22) Filed: Jan. 15, 2002

(65) Prior Publication Data

US 2002/0108836 A1 Aug. 15, 2002

(30) Foreign Application Priority Data

Jan. 16, 2001 (DE) .......................................... 101 02 413

(51) Int. Cl.[7] .............................................. B25J 21/00
(52) U.S. Cl. ..................... 414/222.01; 901/8; 901/16
(58) Field of Search ................... 414/222.01, 222.08; 198/346.2, 468.2, 619; 901/8, 16

(56) References Cited

U.S. PATENT DOCUMENTS 4,890,241 A * 12/1989 Hoffman et al. ............ 901/8 X
5,623,853 A * 4/1997 Novak et al. ............. 901/16 X
6,078,876 A * 6/2000 Rosenberg et al. ....... 700/195 X

FOREIGN PATENT DOCUMENTS

| DE | 42 12 178 A1 | 10/1993 |
| DE | 197 20 906 A1 | 9/1998 |
| DE | 198 24 014 A1 | 12/1999 |
| DE | 199 15 023 A1 | 10/2000 |
| EP | 0 865 869 A1 | 9/1998 |

* cited by examiner

Primary Examiner—Donald W. Underwood
(74) Attorney, Agent, or Firm—Harness, Dickey & Pierce, P.L.C.

(57) ABSTRACT

An automated cell for the handling of workpieces is disclosed that comprises a working space within which a two-dimensional gantry that comprises a first and a second linear axis which are coupled to each other. A first gripping device is movable across the working space horizontally and also vertically. A gantry extends above the working space and protrudes towards a machine tool. Along the gantry a second gripping device is displaceable for moving workpieces between the working space of the automated cell and the machine tool. Both linear axes of the two-dimensional gantry are driven by linear motor drives, to allow a fast movement of workpieces and also to allow the performing of supplementary functions without slowing down the machine tool supplied by the automated cell.

9 Claims, 3 Drawing Sheets

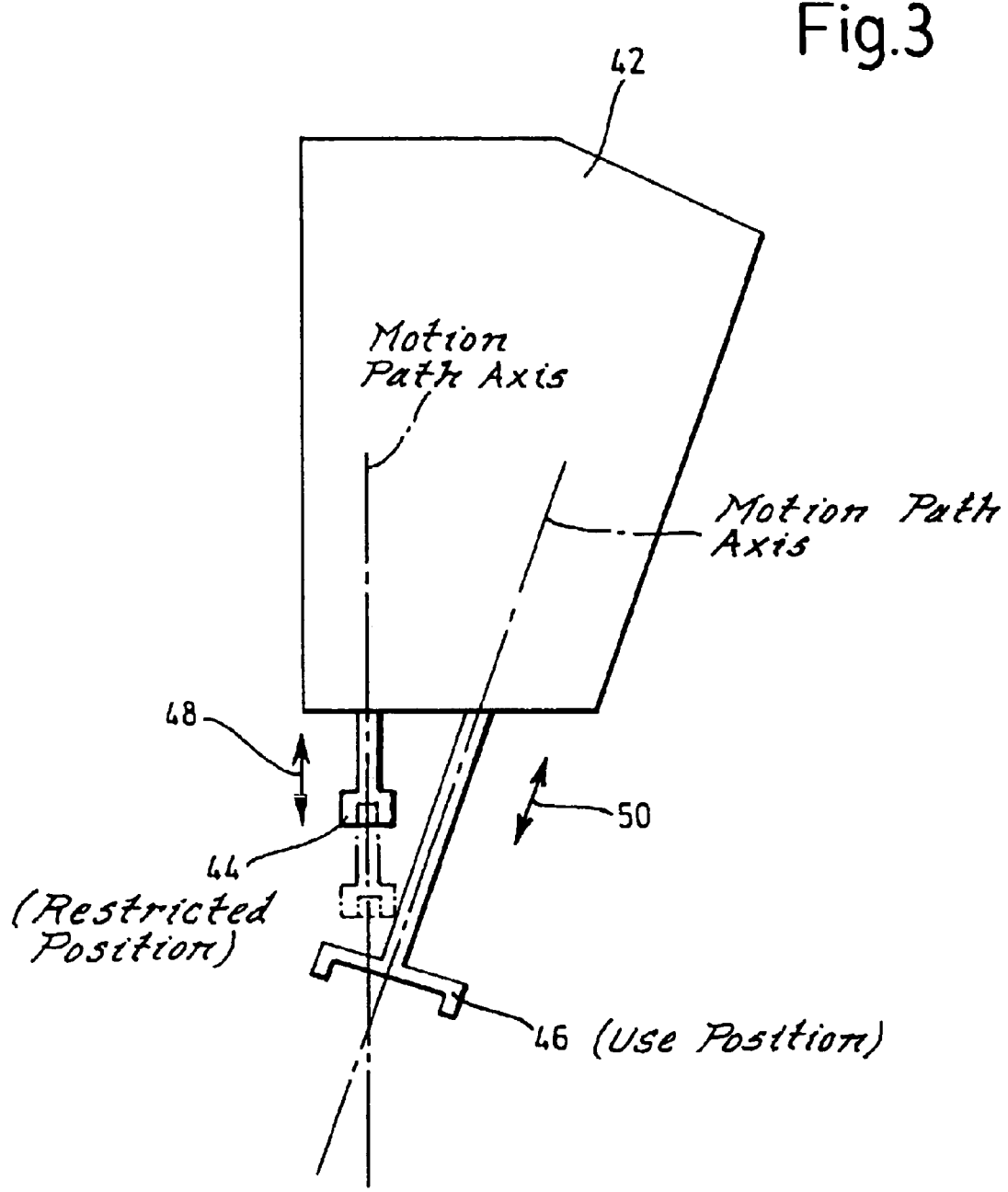

AUTOMATED CELL FOR HANDLING OF WORKPIECES

BACKGROUND OF THE INVENTION

The invention relates to an automated cell for handling of workpieces, having a working space having at least a loading space into which a workpiece carrier for receiving workpieces can be loaded from the outside, having a handling device with a first gripping device for receiving workpieces from the workpiece carrier and for transferring of workpieces within the working space, and having a gantry upon which a carriage having a second gripping device is displaceable for removing workpieces from the working space and transferring same to a machine tool assigned thereto, and for receiving workpieces from the machine tool, and for transferring same into the working space.

Such an automated cell is known from DE 197 20 906 A1.

The known automated cell comprises a closed working space within which a loading space is provided separated by a protective wall. Parts that are placed on workpiece carrier stacks can be transferred into the loading space by means of a stack-changing module. Within the working space a stack presentation device is provided which is adapted for moving workpiece carrier stacks into a waiting area and which is adapted for moving a workpiece carrier into a waiting position from which parts can be removed by means of a gripping device arranged displaceable and vertically movable on a gantry toward a machine tool associated thereto, while machined parts can be received from the machine tool and placed again on the workpiece carrier.

The known automated cell is particularly suited for high throughput within a series fabrication, wherein, due to workpiece carrier stacks within the working space and within the loading space, a high buffer action is reached along with a decoupling between the handling of parts within the working space and loading or removal of part carriers from the loading space. The known automated cell is thus particularly suited for large series production of large parts and can also be utilized for supplying several machining centers. On the other hand, the turning stand directs a certain breadth of the cell which cannot be totally utilized for a pallet width due to the turning circle. Also the loading device utilized within the working space is relatively complicated.

From DE 198 24 014 A1 another automated cell comprising a working space closed to the outside is known within which a loading device for receiving at least one part carrier is arranged displaceable in horizontal and in vertical direction. Parts can be transferred into and out of, respectively the working space by means of a feeding device which is, preferably, configured as a transfer carriage and which comprises a support for receiving a part carrier at working level. The workpiece carriers can be transferred into the working space through a loading aperture the opening and closing of which is controlled automatically.

With such an automated cell the required space may be held relatively small, however within the working space only complete workpiece carriers are moved, rather than single workpieces.

For certain manufacturing tasks, for instance in the manufacturing of injection pumps for the common rail technique the workpieces must be machined extremely precisely and must for instance be measured or subjected to a different operation step in the automated cell. Thus the workpieces must for instance be tilted in the automated cell, pre-measured, finally measured or subjected to a brushing or cleaning operation.

In particular due to the short machining time of small parts up to now for performing such supplementary tasks within the automated cell additional handling devices are necessary that work in parallel, to avoid that the pick-up and supplementary tasks within the automated cell lead to a deceleration of the working cycle of the machine tool supplied thereby.

SUMMARY OF THE INVENTION

Thus it is the object of the invention to provide an improved automated cell for handling of workpieces and an improved process for the handling of workpieces which avoid the drawbacks of the prior art to a considerable part. In particular, the automated cell shall have a simple and space-saving design and shall allow the feeding or removal, respectively, of workpieces into or out of, respectively, a machine tool associated thereto in the simplest possible way, while being sufficiently fast even with very small workpiece machining times.

This object is achieved in the automated cell mentioned at the outset according to the invention in that the handling device is configured as a two-dimensional gantry having a first linear axis extending in longitudinal direction within the working space and being coupled with a second longitudinal axis extending in transverse direction, wherein the first gripping device is received on one of the linear axes vertically displaceably, in that at least one supplementary station such as an aligning station, a pre-measuring station, a final measuring station, a tilting/reversing station, a cleaning station or a transfer space for the second gripping device provided, wherein the first gripping device is displaceable between the first workpiece carrier and at least one supplementary station, wherein the second gripping device is displaceable between at least one supplementary station and the machine tool, and wherein at least the linear axes of the two-dimensional gantry comprise a linear motor drive.

The object of the invention is thus completely achieved.

According to the invention by coupling a two-dimensional gantry, along which the first gripping device is displaceable in longitudinal and transverse direction of the working space as well as in vertical direction, with a gantry for tying to the machine tool, workpieces can be supplied to the machine tool in time within the working cycle given by the machine tool, and machined workpieces can be removed therefrom. In addition, also supplementary operations, such as aligning, pre-measuring, or final measuring can be performed without impairing the working cycle of the machine tool thereby. This is achieved substantially by driving the linear axes of the two-dimensional gantry by means of linear motor drives, thereby, due to the high operating speed of linear drives, providing sufficient time for performing supplementary functions without impairing the working cycle of the machine tool. The automated cell according to the invention has a particularly compact design, since no additional drives are necessary for such supplementary stations.

The object of the invention is further achieved by a process comprising the following steps:
  transferring workpieces on a workpiece carrier into a loading space of a working space;
  picking up workpieces from the workpiece carrier by means of a first gripping device between displaceable and transverse in longitudinal direction and in vertical direction of a two-dimensional gantry which comprises a first linear axis extending in longitudinal direction of the working space, and a second linear axis extending in transverse direction of the working space and being coupled with the first linear axis;

displacing the workpieces to a second gripping device being displaceable along a gantry which connects the working space with a machine tool allocated thereto which has a main time for machining a workpiece and an idle time for loading and unloading of workpieces;

within the main time transferring a workpiece by means of the second gripping device from the working space toward the machine tool;

within the idle time turning over the workpiece to the machine tool and receiving a machined workpiece from the machine tool;

within the main time displacing the workpiece received from the machine tool into the working space;

within the main time receiving a workpiece from the second gripping device by means of the first gripping device and displacing toward the workpiece carrier;

wherein the first gripping device within the main time turns over and receives workpieces between at least one supplementary station, such as an aligning station, a pre-measuring station, a final measuring station, a tilting/reversing station, a cleaning station or a support station, and between the workpiece carrier and vice versa.

In this way according to the invention the remaining part of the main time of the machine tool within which the workpiece is machined, is utilized not only for transport functions but also for performing supplementary functions.

In a further development of the automated cell the second gripping device is configured as a V-loader having two gripping units that are movable alternately on linear motion paths converging in a V-shaped manner into a predetermined point.

Thus it is made possible to receive machined workpieces and to supply workpieces for machining to the machine tool, even within a very short idle time of the machine tool. Such short idle times are particularly important with respect to small workpieces having a short main time. To further improve the velocity also with respect to very short idle times, it is advantageous to provide also the second gripping device with linear motor drives.

The first gripping device of the automated cell is suitably arranged on a carriage driven by one of the linear axes and comprises a vertical guidance along which a gripping element is received displaceable in vertical direction.

According to an additional advantageous design the workpiece carrier may be placed in a drawer that is arranged transferable into and out of the loading space.

Thereby a particularly simple and space-saving design of the automated cell is reached.

According to an additional improvement of this design two loading spaces, into which the workpiece carriers can be transferred, are arranged adjacent each other.

According to this feature switching from one workpiece carrier to another workpiece carrier is made possible within the working space without interrupting the handling operations.

According to an additional development of the invention three loading spaces are arranged adjacent each other for receiving workpiece carriers.

This feature offers the advantage to allow a space-specific operation, that is a placing of the workpieces after machining on their original position, even when the respective machine tool holds a plurality of workpieces, before these are unloaded, as for instance the case with circular cycled machines. In these cases it is not necessary to empty the machine tool completely, before machining the next workpiece carrier, since always two workpiece carriers are accessible for machining, while the third workpiece carrier can be loaded or unloaded, respectively, independent thereof.

According to a further advantageous development of the invention a cover is provided that is movable in the direction of the second linear axis for separating one of the loading spaces from the working space protected against contact when loading and unloading.

Thereby a separation of the loading space from the working space is made possible for loading and unloading in a particularly simple way, protected against contact, while simultaneously workpieces from the workpiece carrier or from another carrier can be machined.

According to an additional development of the invention one of the linear axes comprises at least two linear motor drives arranged parallel to each other, the sliders of which being movable together in synchrony, wherein at least one of the sliders comprises a hall sensor for sensing the inductor rail, the hall sensor being coupled with both linear motor drives for controlling same.

This design which is also protectable independent from the other features of the automated cell, allows a considerable simplification and a considerable reduction in cost when compared to prior art linear motor drives, since when utilizing two parallel linear motor drives for driving a common carriage, in the prior art two incremental scales, for instance two glass scales, were necessary for controlling both linear motor drives with the necessary accuracy in synchrony.

However, it was found that the preciseness of common hall sensors which is in the order of a hundredth of a millimeter, is sufficient to provide the synchronous driving of a common carriage for the handling operations in this context.

According to a preferred improvement of the invention also at least the gantry or one of the gripping device comprises a linear motor drive.

As far as also the remaining drives of the automated cell are configured as linear motor drives, the working speed can further be raised, whereby more time is provided for performing additional tasks within the automated cell, without impairing the working speed of the machine tool supplied thereby.

According to a preferred development of the process according to the invention the transfer of a workpiece between the workpiece carrier and the at least one supplementary station as well as the working operation performed on the latter, is performed within the main time.

According to an additional development of the process according to the invention a gripping device having at least two gripping units for each workpiece is utilized for at least one of the gripping device.

Herein preferably a V-loader is utilized as a gripping device, the loader comprising two gripping units that are alternately movable along linear motion paths converging in a V-shaped manner toward a predetermined point.

Alternatively, it would also be conceivable to utilize a H-shaped loader comprising two gripping units or an I-shaped loader comprising two gripping units received, for instance, on a rotation axis.

As mentioned already before, at least the linear axes of the two-dimensional gantry are preferably driven by a linear motor drive.

By these measures a particularly fast operation when handling workpieces is supported to allow a loading and unloading of workpieces and possible supplementary operations within the main time of the machine tool, even with very fast operating machine tools, without causing a waiting time of the machine tool.

It will be understood that the above-described features and those to be discussed below are applicable not only in the given combinations, but may be used in other combinations or taken alone without departing from the scope of the invention.

BRIEF DESCRIPTION OF THE DRAWINGS

Further features and advantages of the invention will become apparent from the following description of a preferred embodiment taken in conjunction with the drawings, in which:

FIG. 3 is an enlarged view of the V-loader shown in FIG. 1.

DETAILED DESCRIPTION OF THE PREFERRED EMBODIMENT

Figure 1:
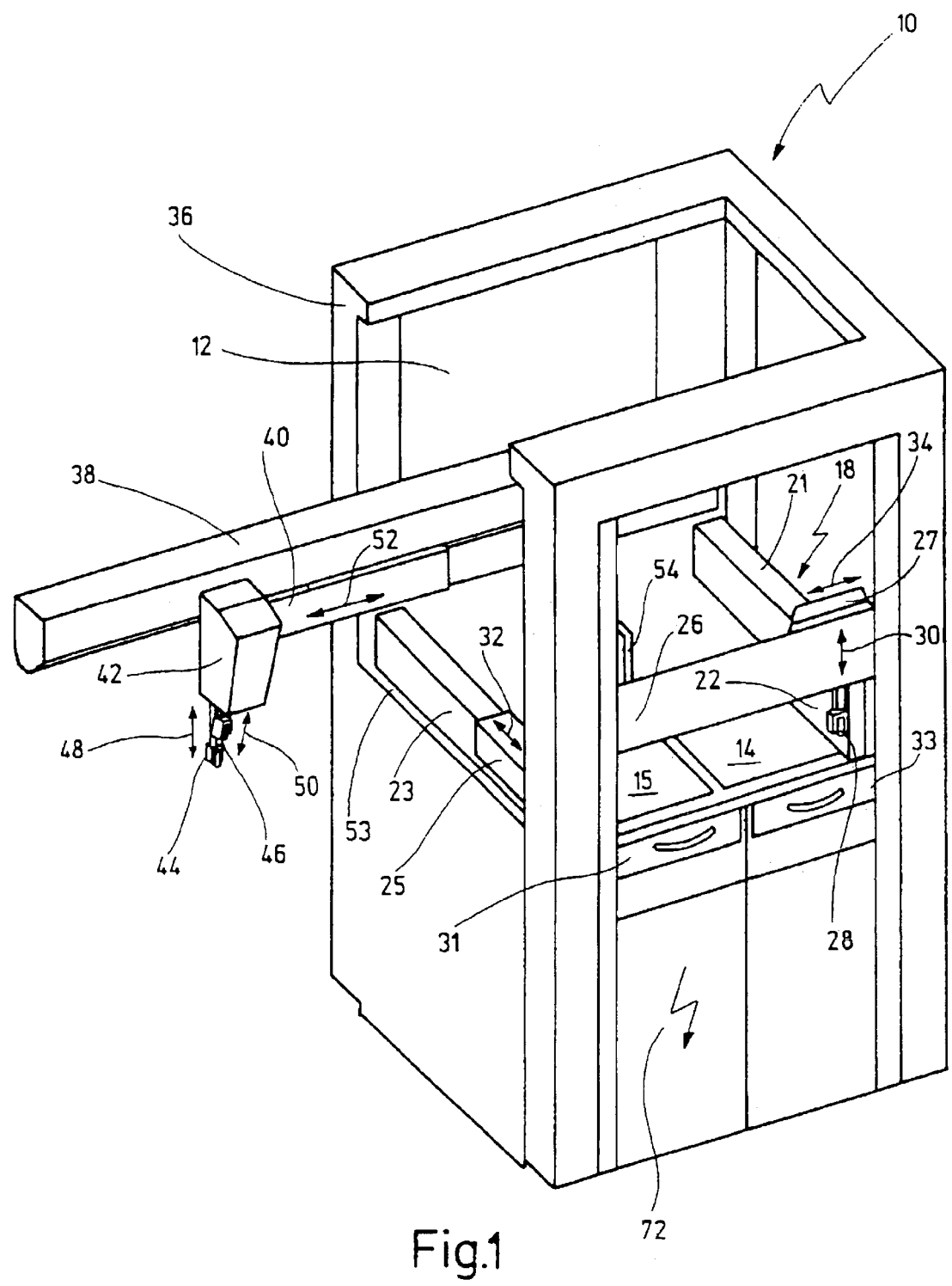
FIG. 1 shows an automated cell according to the invention in a particularly simplified perspective view.

In FIG. 1 an automated cell according to the invention is designated with the numeral 10 in its entirety.

The automated cell 10 comprises a rigid stand 36 having four vertical struts, between which in the upper region a working space 12 separated from the outside is formed (for ease of better explanation two covering sheets that separate the working space 12 from the outside, were removed). On the left side a gantry 38 extending horizontally protrudes out of the working space 12, the gantry extending over the complete width of the working space 12 and thus far out of the working space 12 of the automated cell 10, so that the gantry 38 can protrude into a machine tool 70 (FIG. 2) assigned thereto and to supply same with workpieces.

The handling device 10 comprises two loading spaces 14, 15 adjacent each other which are shown in FIG. 1 only schematically. Two drawers 31, 33 which are supported on stand 36 receive according to FIG. 2 workpiece carriers 16, 17 which may be transferred into or out of, respectively, the loading spaces 14, 15. For loading or unloading, respectively, the respective drawer 31, 33 is extended and a workpiece carrier 16, 17 holding workpieces is placed therein or removed therefrom, respectively. It would also be conceivable to place the workpieces manually individually in the drawer 31, 33, or to remove them therefrom, respectively. Alternatively the workpiece carriers 16 or 17, respectively, could also be configured on a transfer carriage which may be transferred into or out of, respectively the loading space 14, 15, such as generally known from DE 198 24 014 A1.

Figure 2:
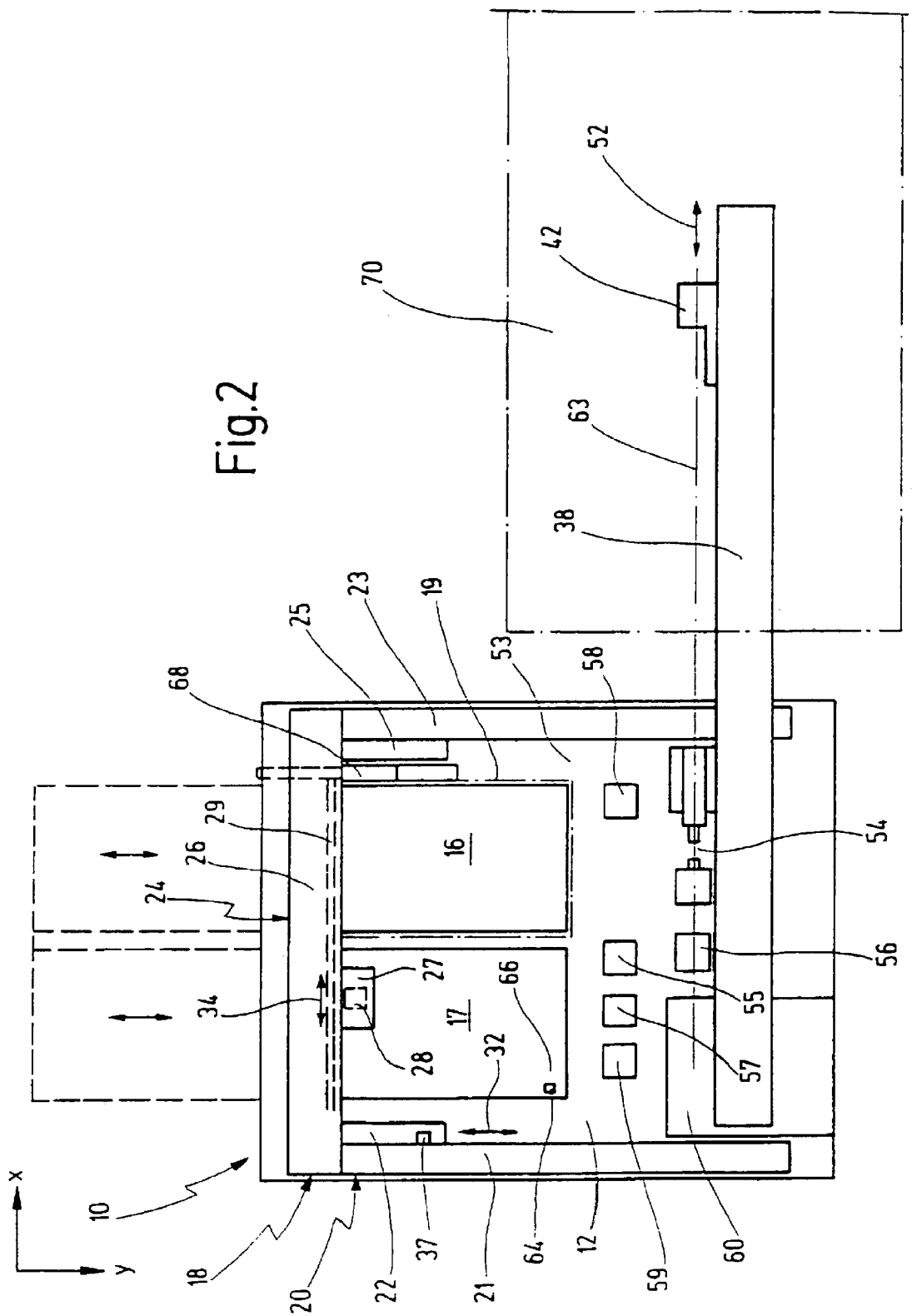
FIG. 2 is a particularly simplified top view of an automated cell according to the invention.

In the position shown in FIG. 1 both drawers 31, 33 are retracted in the working spaces 14, 15, wherein the respective workpieces 16, 17 within the working space 12 are positioned roughly at half the height of the automated cell 10. To achieve a closure of the working space 12 from the outside which is protected against contact and to guarantee that the workpieces of one workpiece carrier 16 or 17 can be processed, while the other workpiece carrier 17 or 16 can be withdrawn for loading or unloading, respectively, a cover is provided which is shown in FIG. 2 only in a dash-dotted line 19. The cover can also be configured as a plate, which, for instance, is arranged displaceable along a guidance 29 shown in dashed lines, for separating the loading space 16 of the drawer 31, 33 that is not currently processed and which thus may be extended fully or in partial, from the working space 12 protected against contact. Herein each drawer 31, 33 is separated from the outside like a known drawer by side walls and is open only on its upper side. The drawer 31, 33 that is to be processed and the cover 19 are mechanically locked in the retracted position or the covering position, respectively, above the other drawer. Alternatively, an electronic protection device could be provided.

Within the working space 12 a two-dimensional gantry 18 is provided which according to FIG. 2 comprises a first linear axis 20 (Y-axis) extending in longitudinal direction of the automated cell, and further comprising a second linear axis 24 (X-axis) extending in transverse direction of the automated cell 10. The first linear axis 20 comprises two linear motor drives 21 and 23, that are each supported on the stand 36 at the edge-side and that further comprise an inductor rail, on which a slider 22 or 25, respectively guided thereon is driven (confer double arrow 32). Both sliders 22, 25 are connected by an additional linear motor drive 26, which forms the second linear axis. The inductor rail of the linear motor drive 26 is also configured as a carriage which is driven by both sliders 22, 25 of the linear motor drives 21, 23 in synchrony. Along the inductor rail of the linear motor drive 26 a carriage 27 is driven in X-direction (confer double arrow 34). A first gripping device 28 is supported vertically (Z-direction) displaceably on carriage 27, as shown by double arrow 30 in FIG. 1.

To allow a common control of both linear motor drives 21, 23 of linear axis 20, a hall sensor 37 is attached to the slider 22 for sensing the inductor rail of the linear motor drive 21. The preciseness of the hall sensor 37 which is on the order of a hundredth of a millimeter is sufficient for controlling both linear motor drives 21, 23 in synchrony. Thus the utilization of two incremental scales, which usually would be necessary, can be avoided.

The first gripping device 28 can be displaced substantially across the total inner surface of the working space 12, while parts can be picked up by the gripping device 28, which is vertically displaceable, and can be placed at a different position.

Along gantry 38 that is attached to stand 36 on the side opposite of the two workpiece carriers 16, 17, a carriage 40 is guided displaceably in X-direction, as indicated by double arrow 52. The carriage 40 is displaceable along gantry 38 by means of a toothed belt (now shown) and a servo motor, or by means of a linear motor drive. At the outer end of carriage 40 a second gripping device 42 is supported which may for instance be configured as a V-loader (FIG. 3), comprising two gripping units 44, 46, which can alternately be moved toward a point below thereof along linear motion paths converging in a V-shaped manner, as indicated by double arrows 48, 50. This V-loader 42 allows to utilize the one gripping unit 44 and the other gripping unit 46 alternately, while the respective other gripping unit is in a raised, retracted position.

On a support plate 53 at the bottom of working space 12, above which the workpiece carriers 16, 17 are arranged, a set of supplementary stations is positioned, from which in FIG. 1 only one is indicated by numeral 54, as an example.

As can be seen from the presentation in FIG. 2, several of such supplementary stations are provided below and before gantry 38 in X-direction behind each other, as indicated by numerals 54, 56 and 60. These supplementary stations 54, 56, 60 are positioned below the drive axis 63 of the second gripping device 42 which is configured as a V-loader.

These supplementary stations may be various devices, for instance a pre-measuring station 60 for grinding in pairs, a tilting station 56 and a final measuring station 54.

At least one of the supplementary stations 54, 56, 60 can be reached simultaneously by the second gripping device 42, since it is positioned below the drive axis 63 of the second gripping device 42, and can also be reached by the first gripping device 28.

In addition, within the space that can be reached by the first gripping device 28, on the support plate 53 additional supplementary stations may be placed as shown in FIG. 2 in a line behind each other, such as a blower station or a cleaning station 59, an aligning station 57 and an intermediate support station 55. In addition, a calibration master unit support can be provided, as shown by numeral 58. The calibration master unit support 58 serves for receiving a calibration master, for instance for the final measuring station 54. In case a tilting or turning, respectively of the workpieces is not necessary, the tilting station 56 could also be simply a support station or transfer station in the simplest case.

Additionally in FIG. 2 on the front edge laterally a transfer canal 68 is shown for transferring SPC parts (parts to be checked) into or out of, respectively, the working space 12, as well as for removing NIO parts (defective parts).

The gantry 38 protrudes into the working space of a machine tool, shown in FIG. 2 only schematically and indicated with numeral 70, which is supplied by the automated cell 10 with workpieces which are shown in FIG. 2 schematically and indicated with numerals 64 and 66.

In the present case the machine tool 70 could for instance be a grinding machine in which the workpieces are ground coordinated in pairs (pair grinding).

To this end within the working space 12 of the automated cell 10 the pre-measuring station 60, the tilting station 56 and the final measuring station 54 are arranged. One of the workpieces 64 is pre-measured on the pre-measuring station 60 before supplying to machine tool 70 and is placed again within the workpiece carrier. In parallel thereto the respective other workpiece 66 is transferred to the machine tool 70 by means of the second gripping device 42 and is transferred to the loader thereof and is received after machining by the second gripping device 42, is then transferred to the working space 12 of the automated cell 10 and finally measured on the final measuring station 54. If the actual measurements are within a predefined tolerance, then the respective workpiece 66 is placed thereafter again on the workpiece carrier 17 subsequently in paired configuration with the pre-measured workpiece 64 that is not machined in the machine tool in pair grinding, but only premeasured for coordinating the machining of workpiece 66 therewith.

In addition by means of the transfer canal 68 SPC parts may be transferred to the inside or to the outside, respectively, and parts that are not within the predetermined tolerance (NIO parts) may be removed from the working space 12.

The automated cell 10 operates as follows:

In the beginning workpiece carriers 16 or 17, respectively, with workpieces 64 or 66, respectively, are placed manually into one of the drawers 31, 33, the drawer 33 is transferred into the loading space 14 and is locked in its retracted position within the automated cell 10, to provide a cover of the working space 12 protected against contact from the outside. Simultaneously the other loading space 16 is covered by cover 19, to allow a loading of the other drawer 31 during the processing of workpieces 64 or 66, respectively, following thereafter.

Now workpieces 64 or 66, respectively, are transferred one after another by means of the first gripping device 28 either to the pre-measuring station 60, or are placed on the tilting station 56 arranged adjacent thereto. From the tilting station 56 workpieces may be directly picked up by one of the gripping units 44 or 46, respectively, of the second gripping device 42, and may be transferred to the machine tool 70. From the machine tool 70 a machined workpiece can be received by means of the still free gripping unit 44 or 46 of the second gripping device 42, while immediately thereafter a workpiece to be machined is fed. This is performed in the so-called idle time of the machine tool 70, that is in the loading/unloading time which shall be as short as possible to reach a productivity of the machine tool as high as possible.

All other operations, such as transport operations or other supplementary operations, such as measuring operations, cleaning operations or the like are performed during the main time of the machine tool 70, that is during the machining time of a workpiece. In particular, this operation is made possible, in that both linear axes 20 or 24, respectively, are driven by fast linear motors, and in that the second gripping device 42 is configured as a double gripper means which allows to receive a machined part, and immediately thereafter to feed unmachined parts to the machine tool 70.

Due to the fast operation of the first gripping device 28, in addition, during the remaining main time further supplementary functions may be performed, such as a cleaning (for instance by brushing or blowing with pressurized air) at a cleaning station 59 or an aligning. In many cases the workpieces to be machined placed on the workpiece carrier 16, 17 are held in a position which is tilted by 90° with respect to the machining position within the machine tool 70, thus the workpieces are tilted by 90° at the tilting station 56 before transferring to the machine tool. In addition, within the main time not utilized, for instance a calibration of the premeasuring station 60 or of final measuring station 54 may be performed. To this end the calibration master unit support 58 is provided. The calibration master unit placed thereon can be transferred to the respective measuring station 54 or 60, respectively by means of the first gripping device 28 and can be placed again thereon when the calibration is completed.

It will be understood that various variations are possible by other or possibly additional supplementary stations and that the respective operation of the automated cell depends from the demands of the process within the machine tool 70 or may be adapted thereto, respectively.

Due to the high inertial forces that may arise from the fast starting and stopping of the linear motor drives, the stand 36 of the automated cell is preferably made from a material providing sufficient dampening and may for instance be made from polymer concrete.

To reach a design of the automated cell 10 as compact as possible, the controller 72 for the cell 10 is integrated within the region below the drawers 31, 33.

What is claimed is:

1. An automated cell for handling workpieces comprising:
   a working space having at least one loading space into which a workpiece carrier for receiving workpieces can be loaded from the outside;

a first two-dimensional gantry located within the working space and having a first linear axis extending in longitudinal direction and a second linear axis extending in transverse direction;

first drive means for displacing said first gantry along said first linear axis, said drive means comprising at least one linear motor drive;

second drive means for displacing a first carriage on said first gantry along said second linear axis;

a first gripping device arranged on said first carriage and comprising third drive means for displacing said first gripping device in vertical direction, the first gripping device being adapted for receiving workpieces from said workpiece carrier in said loading space and for transferring workpieces within the working space;

at least one supplementary station arranged within said working space for performing supplementary operations on said workpieces;

a second gantry extending from said working space toward a machine tool arranged outside of said working space; and a second carriage being displaceable along said second gantry between said supplementary station and said machine tool, said second carriage supporting a second gripping device for removing workpieces from said working space and transferring same toward said machine tool and vice versa.

2. The automated cell of claim 1, wherein said supplementary station is one of the group formed by an aligning station, a pre-measuring station, a final measuring station, a tilting/reversing station, a cleaning station, a support station or a calibration master holding station.

3. The automated cell of claim 1, wherein said second gripping device is configured as a V-loader having two gripping units that are movable alternately on linear motion paths converging in a V-shaped manner into a predetermined point.

4. The automated cell of claim 1, further comprising a drawer for receiving said workpiece carrier, said drawer being supported movably into and out of said loading space.

5. The automated cell of claim 1, wherein a plurality of loading spaces are provided adjacent each other for receiving workpiece carriers.

6. The automated cell of claim 5, wherein two loading spaces are provided adjacent each other for receiving workpiece carriers.

7. The automated cell of claim 5, further comprising a cover that is movable in the direction of the second linear axis for separating one of the loading spaces from the working space so as to protect a respective loading space from contact with the working space during loading and unloading.

8. The automated cell of claim 1, wherein said second gantry comprises a linear motor drive.

9. The automated cell of claim 1, wherein one of the gripping device comprises a linear motor drive.

* * * * *